US010190610B1

(12) United States Patent
Busscher et al.

(10) Patent No.: US 10,190,610 B1
(45) Date of Patent: Jan. 29, 2019

(54) MOUNTING ASSEMBLY FOR REARVIEW DEVICE (71) Applicant: Gentex Corporation, Zeeland, MI (US)

(72) Inventors: Bradley L. Busscher, Grand Rapids, MI (US); Timothy J. Cercone, Allendale, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 15/783,404

(22) Filed: Oct. 13, 2017

(51) Int. Cl.
*B60R 1/02* (2006.01)
*F16B 2/22* (2006.01)
*B60R 1/04* (2006.01)

(52) U.S. Cl.
CPC . *F16B 2/22* (2013.01); *B60R 1/04* (2013.01)

(58) Field of Classification Search
CPC ................. B60R 1/04; B60R 1/12; F16F 1/32
USPC ....... 248/475.1, 476, 549; 359/842, 871–877
See application file for complete search history.

(56) References Cited

U.S. PATENT DOCUMENTS

| | | | |
|---|---|---|---|
| 4,254,931 A | 3/1981 | Aikens et al. | |
| 4,948,085 A | 8/1990 | Mittelhaeuser | |
| 5,058,851 A | 10/1991 | Lawlor et al. | |
| 5,100,095 A | 3/1992 | Haan et al. | |
| 5,377,948 A | 1/1995 | Suman | |
| 5,377,949 A | 1/1995 | Haan et al. | |
| 5,820,097 A * | 10/1998 | Spooner | B60R 1/04 248/549 |
| 5,931,440 A | 8/1999 | Miller | |
| 6,250,148 B1 | 6/2001 | Lynam | |
| 6,299,319 B1 | 10/2001 | Mertens et al. | |
| 6,326,613 B1 | 12/2001 | Heslin et al. | |
| 6,326,900 B2 | 12/2001 | DeLine et al. | |
| 6,341,523 B2 | 1/2002 | Lynam | |
| 6,447,127 B1 | 9/2002 | Yoshida et al. | |
| 6,483,438 B2 | 11/2002 | DeLine et al. | |
| 6,516,664 B2 | 2/2003 | Lynam | |
| 6,843,575 B2 | 1/2005 | Wachi | |
| 6,968,736 B2 | 11/2005 | Lynam | |
| 7,667,579 B2 | 2/2010 | DeLine et al. | |
| 7,717,394 B2 | 5/2010 | Tanaka et al. | |
| 7,726,623 B2 | 6/2010 | Miler | |
| 8,134,117 B2 | 3/2012 | Heslin et al. | |
| 8,226,064 B2 * | 7/2012 | Ohashi | B60R 1/04 248/476 |
| 8,309,907 B2 | 11/2012 | Heslin et al. | |

(Continued)

FOREIGN PATENT DOCUMENTS

| | | |
|---|---|---|
| EP | 169734 B1 | 10/1989 |
| JP | 2004082829 A | 3/2004 |
| JP | 2007112206 A | 5/2007 |

*Primary Examiner* — Todd M Epps
(74) *Attorney, Agent, or Firm* — Price Heneveld LLP; Bradley D. Johnson (57) ABSTRACT

A mounting assembly for a rearview device. A windshield bracket defines a central aperture and includes internal ledges disposed about the central aperture. A mount is operably coupled with the rearview device. The mount includes pre-loading posts. A spring clip includes a base and a plurality of legs. Each leg includes an upright portion extending from the base. A connecting portion extends inwardly from the upright portion. An engagement portion extends upward away from the base. At least one loading lever extends laterally from the connecting portion.

18 Claims, 11 Drawing Sheets

(56) References Cited

U.S. PATENT DOCUMENTS

| | | |
|---|---|---|
| 8,456,311 B2 | 6/2013 | Wohlfahrt et al. |
| 9,174,577 B2 | 11/2015 | Busscher et al. |
| 9,244,249 B2 * | 1/2016 | Kim .................. B60R 1/04 |
| 9,573,525 B2 * | 2/2017 | Minikey, Jr. ............ B60R 1/04 |
| 9,682,656 B2 * | 6/2017 | Busscher .............. B60R 1/04 |
| 2008/0315060 A1 | 12/2008 | Muller |
| 2010/0195226 A1 | 8/2010 | Heslin et al. |
| 2011/0168866 A9 | 7/2011 | Gruener et al. |
| 2013/0062497 A1 | 3/2013 | Van Huis et al. |
| 2014/0055617 A1 | 2/2014 | Minikey, Jr. et al. |
| 2014/0091588 A1 | 4/2014 | Renke et al. |
| 2014/0226012 A1 | 8/2014 | Achenbach |
| 2015/0030319 A1 | 1/2015 | Matori |
| 2016/0023605 A1 | 1/2016 | Busscher et al. |

\* cited by examiner

MOUNTING ASSEMBLY FOR REARVIEW DEVICE

BACKGROUND OF THE DISCLOSURE

The present disclosure generally relates to a mounting assembly, and more particularly to a mounting assembly for a rearview device.

SUMMARY OF THE DISCLOSURE

One aspect of the disclosure includes a mounting assembly for a rearview device. A windshield bracket defines a central aperture and includes internal ledges disposed about the central aperture. A mount is operably coupled with the rearview device. The mount includes pre-loading posts. A spring clip includes a base and a plurality of legs. Each leg includes an upright portion extending from the base. A connecting portion extends inwardly from the upright portion. An engagement portion extends upward away from the base. At least one loading lever extends laterally from the connecting portion.

Another aspect of the disclosure includes a mounting assembly for a rearview device. A mount is operably coupled with the rearview device. The mount includes at least one pre-loading post. A spring clip includes a base and a plurality of legs. Each leg includes an upright portion extending from the base. A connecting portion extends inwardly from the upright portion. An engagement portion extends upward away from the base. At least one loading lever extends laterally from the connecting portion. The at least one loading lever is configured to engage the at least one pre-loading post, which pushes the engagement portion away from the base.

Yet another aspect of the disclosure includes a spring clip for a mounting assembly for a rearview device. The spring clip includes a base. A plurality of legs extend outwardly from the base. Each leg includes an upright portion extending from the base. A connecting portion extends inwardly from the upright portion. An engagement portion extends upward away from the base. At least one loading lever extends laterally from the connecting portion. The at least one loading lever is configured to engage a pre-loading post of a mount to push the engagement portion away from the base.

Yet another aspect of the present disclosure includes a mounting assembly for a rearview device having a spring clip that includes preloading features that provide ease of manufacture, while providing a robust connection between the rearview device and the mounting assembly that minimizes buzz squeak and rattle concerns and also maintains a rearview device at a desired elevation relative to the mounting assembly. Installation of a mount with a windshield bracket is also made easier because of the preloading features incorporated into the spring clip.

These and other features, advantages, and objects of the present disclosure will be further understood and appreciated by those skilled in the art by reference to the following specification, claims, and appended drawings.

DETAILED DESCRIPTION OF EMBODIMENTS

The present illustrated embodiments reside primarily in combinations of method steps and apparatus components related to a mounting assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
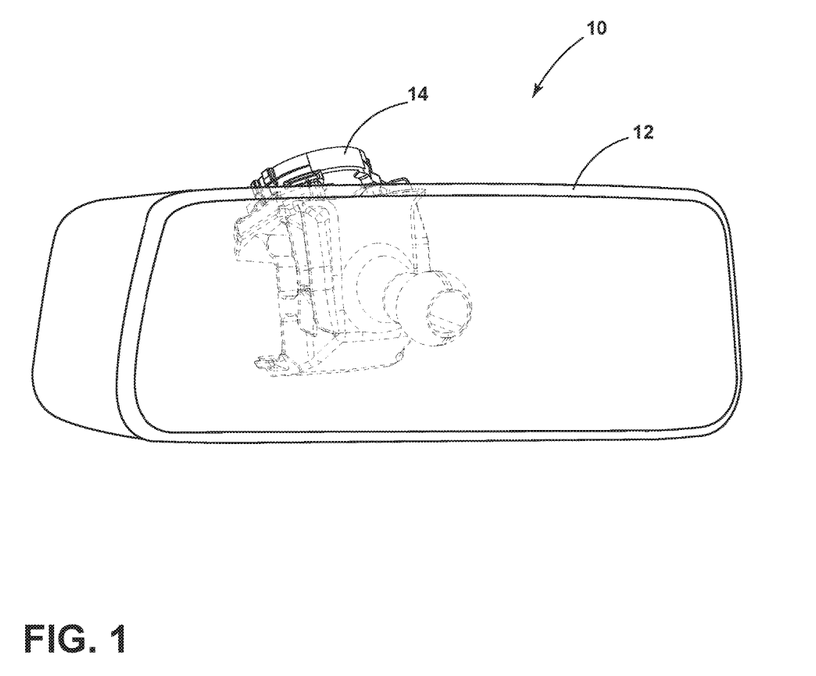
FIG. 1 is a front elevational view of a mounting assembly of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-16, reference numeral 10 generally designates a mounting assembly for a rearview device 12. A windshield bracket 14 having a body 16 that includes internal ledges 18 disposed about the body 16. A mount 22 is operably coupled with the rearview device 12. The mount 22 includes pre-loading posts 24. A spring clip 30 includes a base 32 and a plurality of legs 34. Each leg 34 includes an upright portion 36 extending from the base 32. A connecting portion 38 extends inwardly from the upright portion 36. An engagement portion 40 extends upward away from the base 32. At least one loading lever 42 extends laterally from the connecting portion 38.

Figure 2:
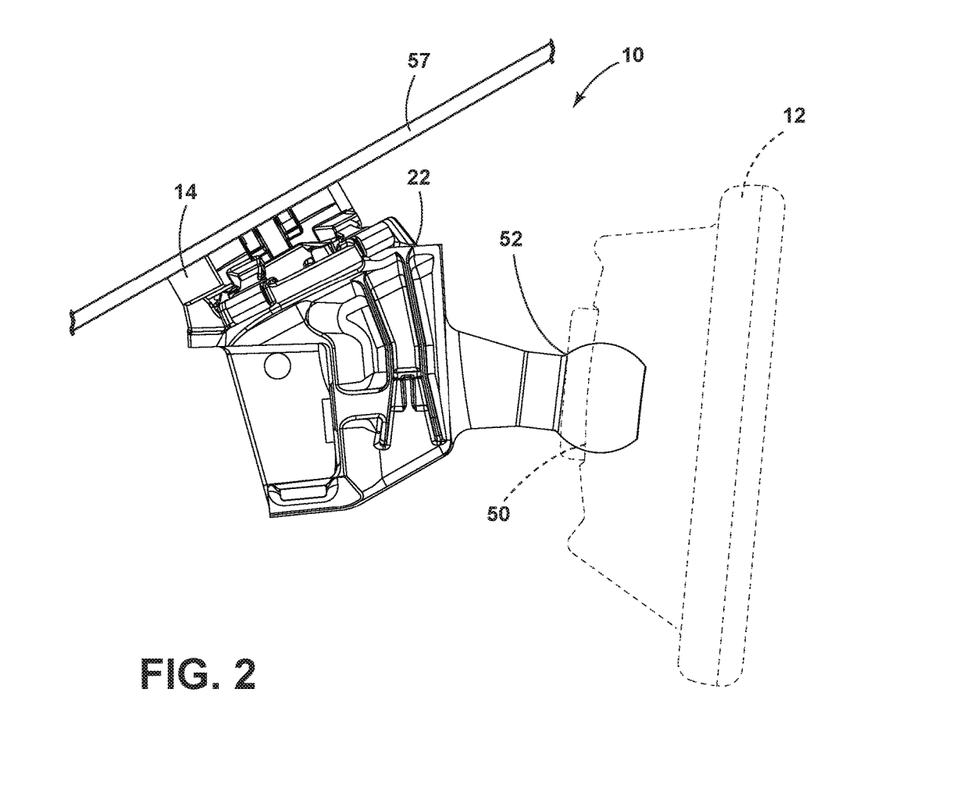
FIG. 2 is a side elevational view of the mounting assembly of FIG. 1.

With reference again to FIGS. 1 and 2, the illustrated figures are generally directed to single pivot mounting assemblies for rearview devices and include a generally simple construction. However, a variety of mounting features that improve long-term operability of the device and which provide better user interface are provided herein to provide the user with a better driving experience. As shown in FIGS. 1 and 2, the rearview device 12 generally includes a socket 50 configured to receive a pivot member or ball 52 of the mount 22. The mount 22, as illustrated, includes the pivot member 52, which is operably coupled with a central body portion 54. The central body portion 54 includes a spring clip interface 56 configured to receive the spring clip 30. The spring clip 30 is removably coupled with the interface 56, typically via mechanical fasteners, although other forms of connection may also be used. The spring clips 30 allow for the mount 22, and consequently the rearview device 12, to be coupled with the windshield bracket 14, which is secured to a windshield 57. The spring clip 30 is configured to provide a secure connection between the mount 22 and the windshield bracket 14, while also allowing for controlled withdrawal of the mount 22 from the windshield bracket 14 in the event a passenger strikes the rearview device 12 during a collision event. Accordingly, the parameters by which the spring clip are constructed and secured to the rearview device 12 are closely monitored and controlled.

The illustrated review device 12 may include any of a number of review device constructions including an electro-optics assembly or a display mirror assembly that displays images captured by an imager. The imager may be positioned inside or outside the vehicle. Although the illustrations show a single ball mount, the pivot member or ball 52 of the mount 22 may include a single ball mount or may include a dual ball arrangement. Regardless of the construction of the review device 12 or the adjustment of the review device 12, the interface 56 of the spring clip 30 with the mount 22 and the preloading that occurs as a result of the structure of the spring clip 30 and preloading posts of the mount provides a stable mounting construction that is easy to manufacture and has high adjustability for a user.

Figure 3A:
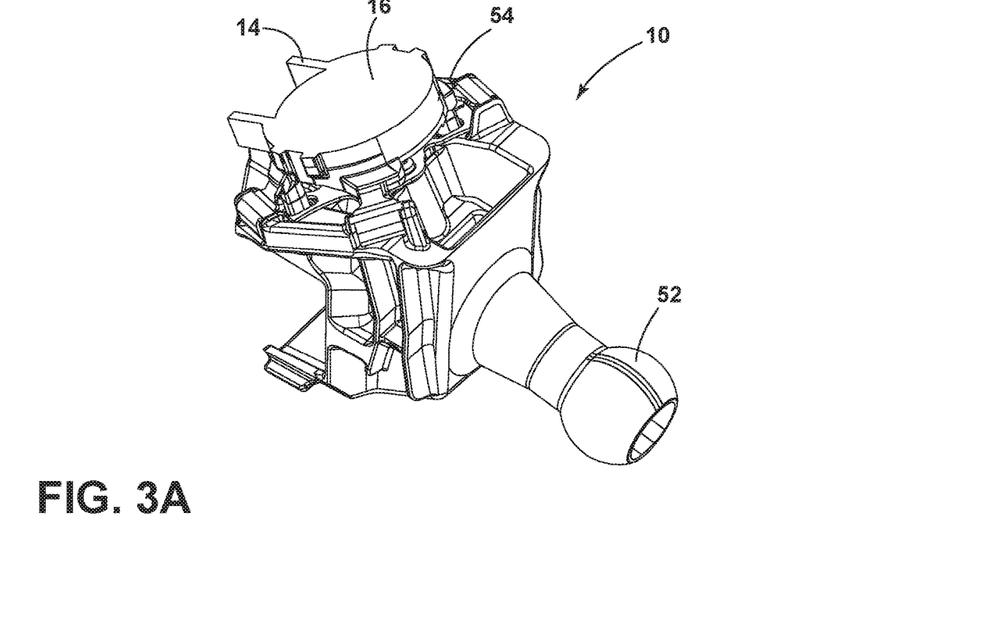
FIG. 3A is a top front perspective view of the mounting assembly of FIG. 1.
Figure 3B:
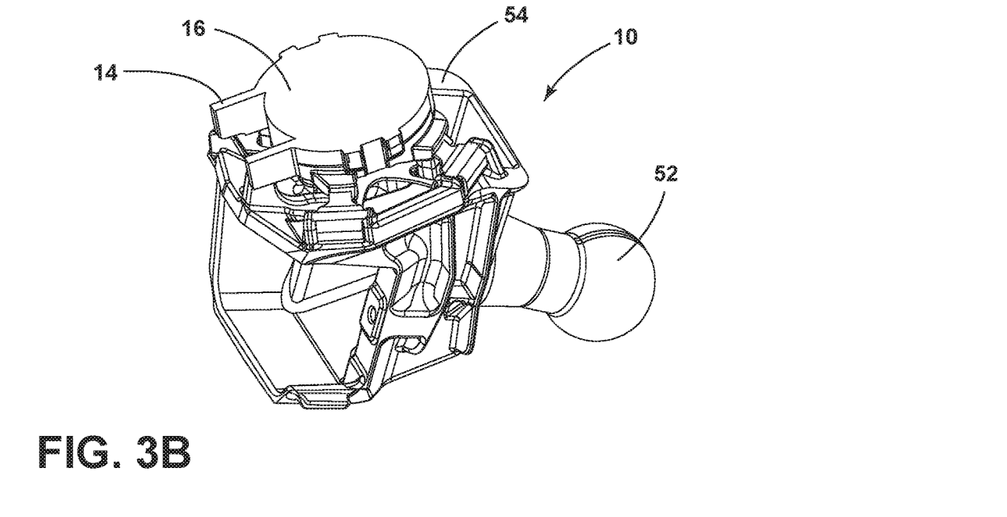
FIG. 3B is a top rear perspective view of the mounting assembly of FIG. 1.
Figure 4:
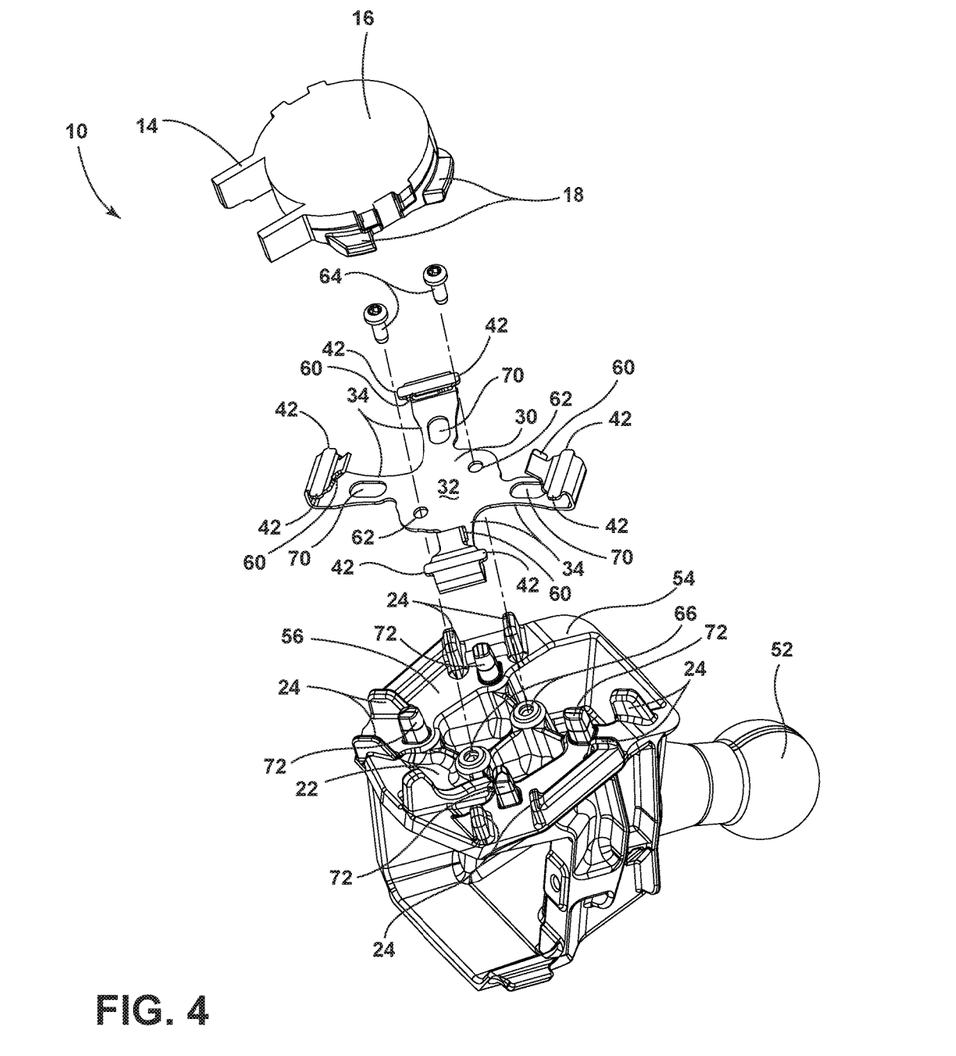
FIG. 4 is a top rear exploded perspective view of the mounting assembly of FIG. 1.

With reference to FIGS. 3A and 3B, the windshield bracket 14 is generally configured to be secured to a windshield or headliner of a vehicle by a fasteners or an adhesive. The body 16 includes ledges 18 which are configured to engage and secure legs 34 of the spring clip 30. It will be understood that the mount 22 may take on a variety of constructions and are not limited to the configuration as shown. The engagement portion 40 of each leg 34 of the spring clip 30 is configured to engage one ledge 18 of the windshield bracket 14. The engagement portion 40 includes an angled flange that acts as an engagement ramp 60, and which assists in facilitating rotation of the mount 22, and specifically, the legs 34 of the spring clip 30 into engagement with the ledges 18 of the windshield bracket 14.

Figure 5:
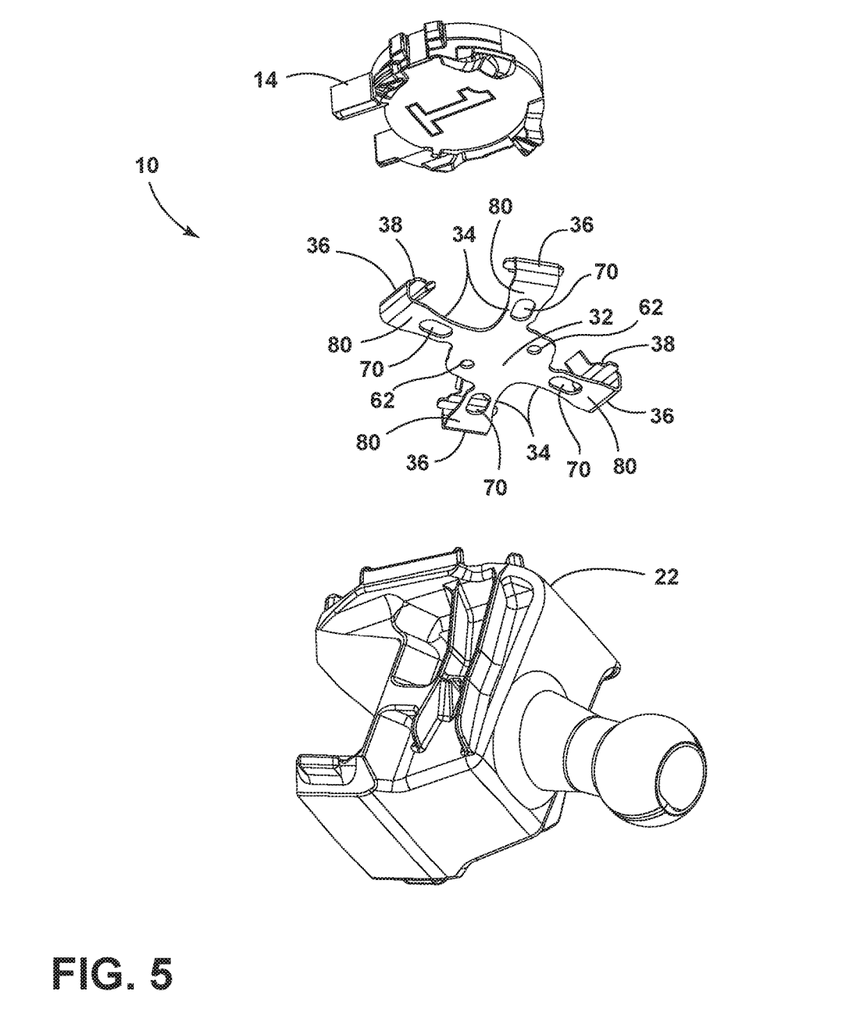
FIG. 5 is a bottom front exploded perspective view of the mounting assembly of FIG. 1.
Figure 6:
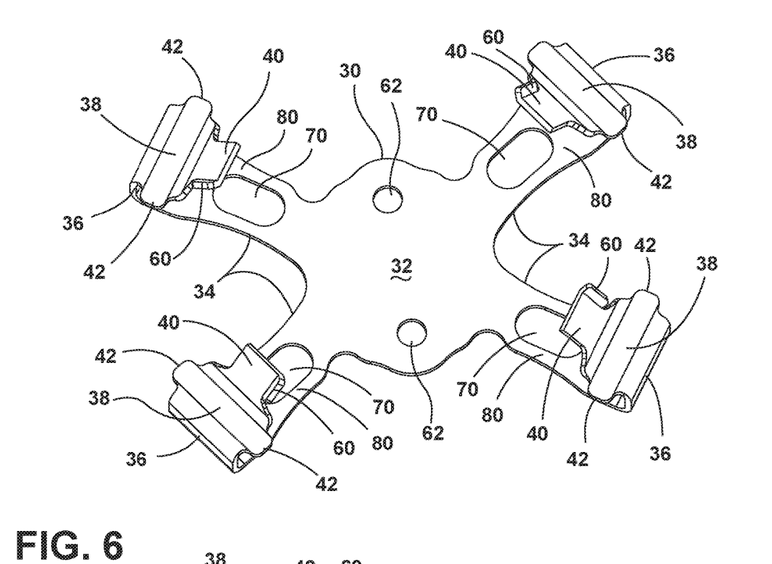
FIG. 6 is a top perspective view of a spring clip for use in a mounting assembly of the present disclosure.
Figure 7:
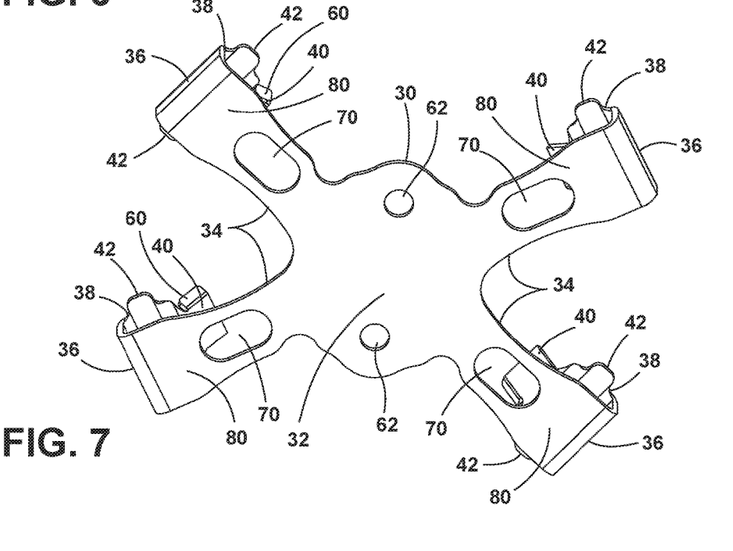
FIG. 7 is a bottom perspective view of a spring clip for use in a mounting assembly of the present disclosure.
Figure 8:
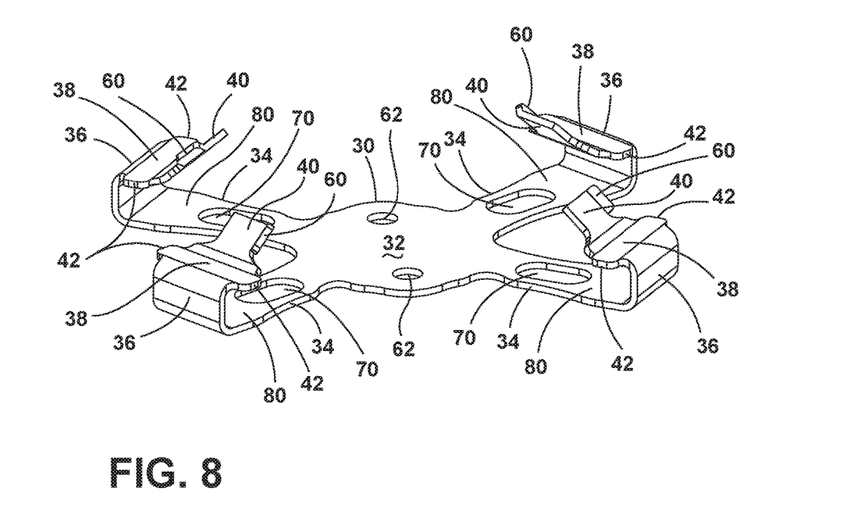
FIG. 8 is a side perspective view of a spring clip for use in a mounting assembly of the present disclosure.
Figure 9:
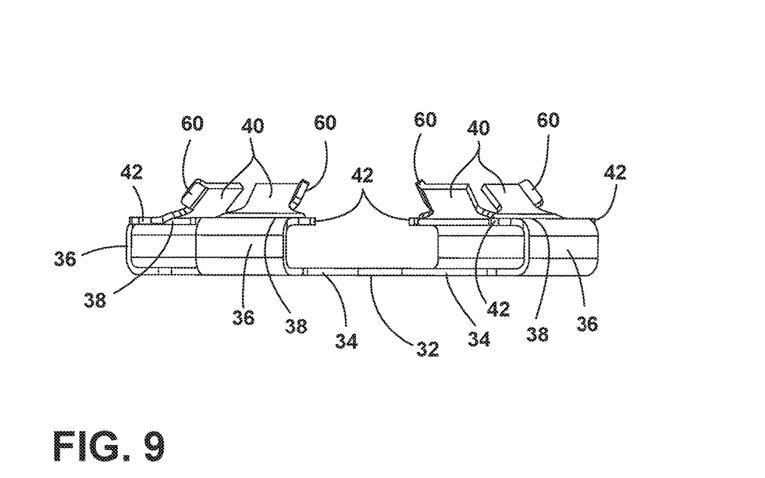
FIG. 9 is a side elevational view of a spring clip for use in a mounting assembly of the present disclosure.
Figure 10:
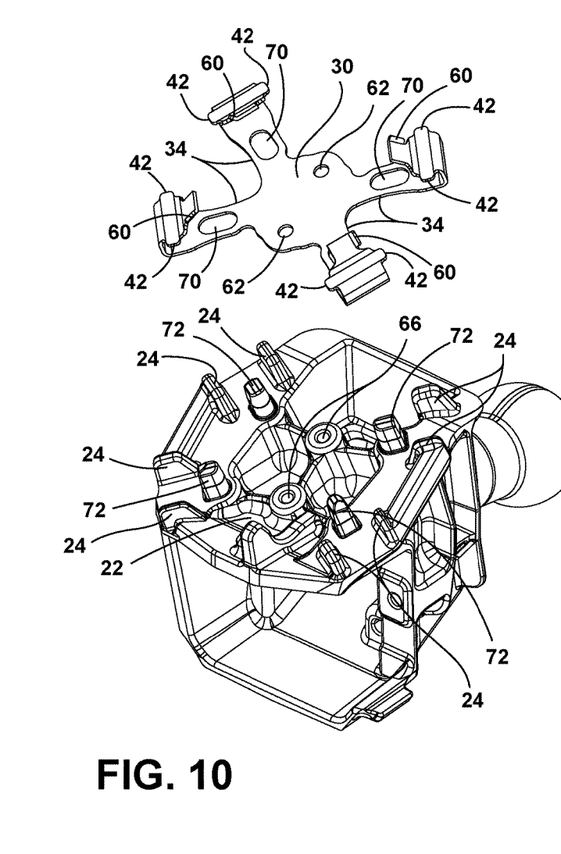
FIG. 10 is a top rear perspective view of a mount for a mounting assembly of the present disclosure prior to connection with a spring clip.
Figure 11:
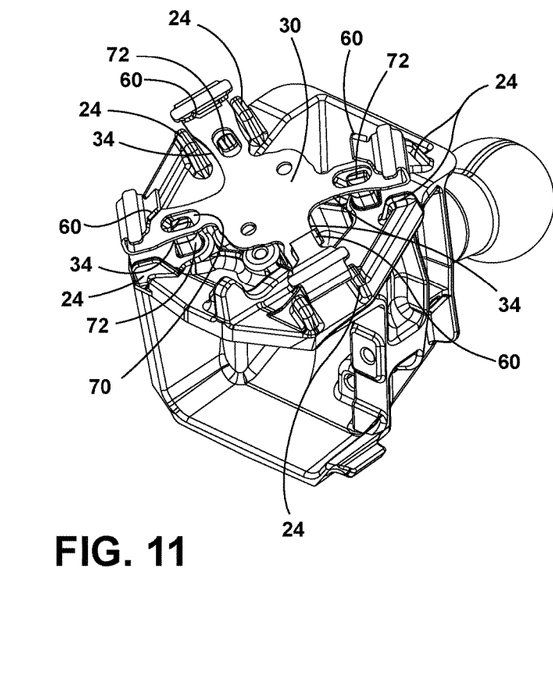
FIG. 11 is a top rear perspective view of a mount for a mounting assembly of the present disclosure during connection with a spring clip.
Figure 12:
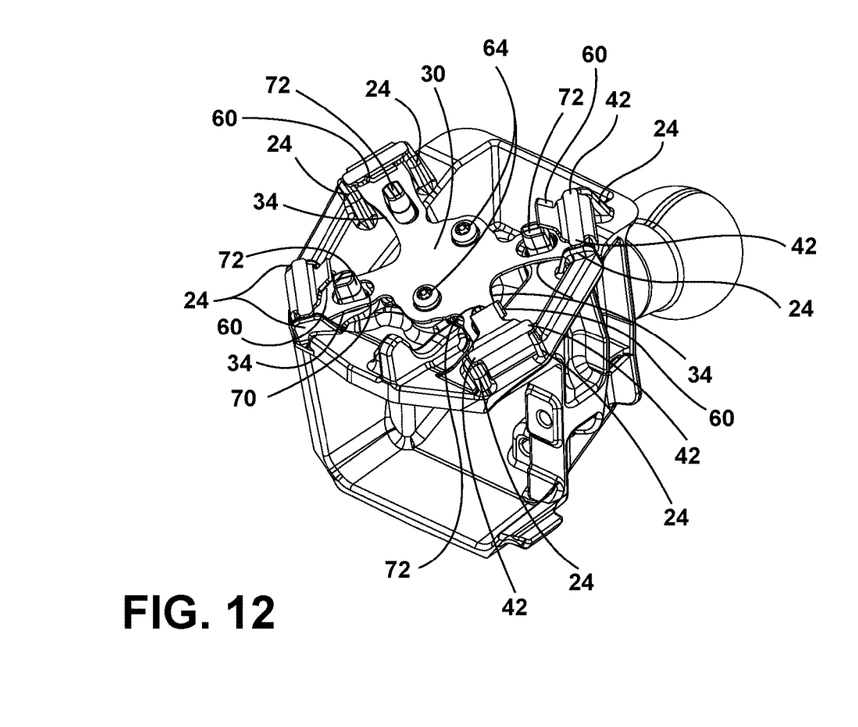
FIG. 12 is a top rear perspective view of a mount for a mounting assembly of the present disclosure after connection with a spring clip.

With reference to FIG. 5, the spring clip 30 includes first and second fastener apertures 62 configured to receive mechanical fasteners 64 that extend through the fastener apertures 62 and which engage receiving apertures 66 of the mount 22. The mechanical fasteners 64 hold the spring clip 30 in position against the mount 22. Two fasteners are shown; however, only one fastener is required and more than two could be used. The windshield bracket 14 engages the spring clip 30 and is held by the ledges 18 of the windshield bracket against the spring clip 30, and specifically, the legs 34 of the spring clip 30. Each leg 34 of the spring clip 30 includes an opening 70 configured to receive a complementary locating post 72 that locates the spring clip 30 relative to the mounts 22 and maintain the orientation of the spring clip 30 relative to the mount 22 as the mechanical fasteners 64 are secured with the receiving apertures 66.

With reference now to FIGS. 6-9, the spring clip base 32 is generally planar and is also generally coplanar with a first portion 80 of each leg 34. The upright portion 36 extends upwardly from the first portion 80 at approximately a 90 degree angle, however other angles are also possible. The connecting portion 38 extends inwardly toward the base 32 from the upright portion 36 and the engagement portion 40 extends upwardly away from the base 32. The engagement portion 40 is attached to the connecting portion 38 and extends at an angle thereto. It is generally contemplated that the engagement portion 40 may extend upwardly from the connecting portion 38 at an angle of between 15 degrees and 85 degrees. In addition, the engagement portion 40 includes the engagement ramp 60, which is configured to assist in engaging the windshield bracket 14 with the spring clip 30. The engagement ramp 60 is angled relative to a planar extent of the engagement portion 40 and configured to abut one of the ledges 18 as the mount 22 is rotated into secure engagement with the windshield bracket 14. The engagement portion 40 may include more than one engagement ramps 60 to facilitate the engagement of the ledges 18 in the opposite rotation direction as depicted in the images. Notably, the connecting portion 38 also includes at least one loading lever 42 extending outwardly away from the connecting portion 38. As illustrated, there are first and second loading levers 42 specifically designed to preload the spring clip 30 prior to engagement of the spring clip 30 with the windshield bracket 14. Accordingly, during installation of the mount 22 and the spring clip 30 with the windshield bracket 14, the spring clip 30 is already pre-loaded such that it is easier to engage the spring clip 30 and the mount 22 without sacrificing a secure connection between the spring clip 30 and the mount 22 to the windshield bracket 14. Specifically, the first and second loading levers 42 extend from opposite sides of the connecting portion 38 and extend in opposite directions at a specific distance from the spring clip interface 56. The specific distance is shorter than the height of the pre-loading posts 24 that extend from the spring clip interface 56 of the mount 22. As the spring clip 30 is fastened to the spring clip interface 56, the loading levers 42, and consequently, the connecting portion 38, is forced away from the base 32. This is due to the space between the loading levers 42 and the first portion 80 being less than the height of the pre-loading posts 24.

Mechanical fasteners 64 are then positioned through the fastener aperture 62 of the spring clip 30 and into the receiving aperture 66 of the mount 22 and rotated into secure connection with the receiving aperture 66 of the mount 22. During rotation of the mechanical fasteners 64, the loading levers 42 come into contact with the pre-loading posts 24. As the base 32 of the spring clip 30 is drawn down onto the spring clip interface 56, the pre-loading posts 24 force the loading levers 42, and consequently, the connecting portion 38, away from the base 32, thereby creating a compressive force between the connecting portion 38 and the base 32. This pre-loading effort reduces the amount of deflection necessary to deflect the spring clip 30 fully during installation of the mount, spring clip and mirror assembly to the windscreen bracket 14. This construction also minimizes the effort required to rotate the mount 22 into place against the windshield bracket 14.

Figures 13, 14:
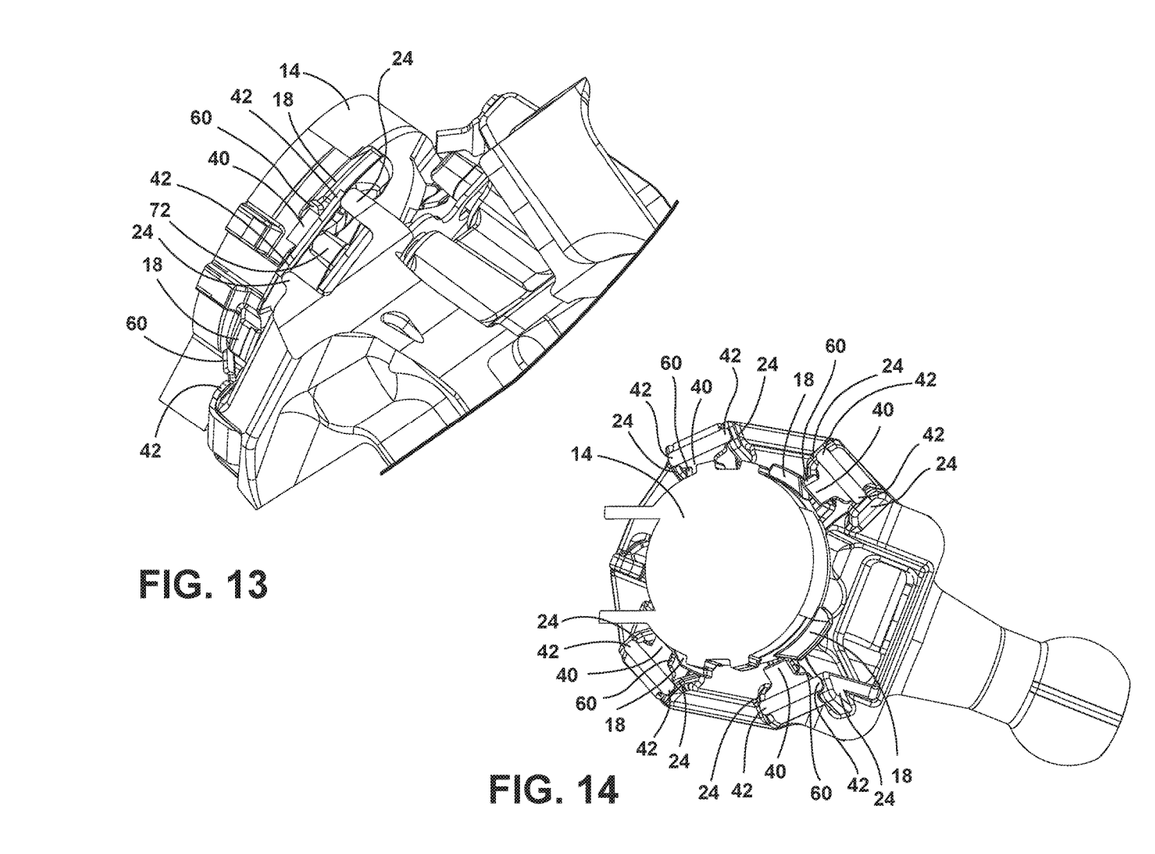
FIG. 13 is a side perspective view of a windshield bracket and mount prior to coupling.
FIG. 14 is a top perspective view of a windshield bracket and mount prior to coupling.
Figures 15, 16:
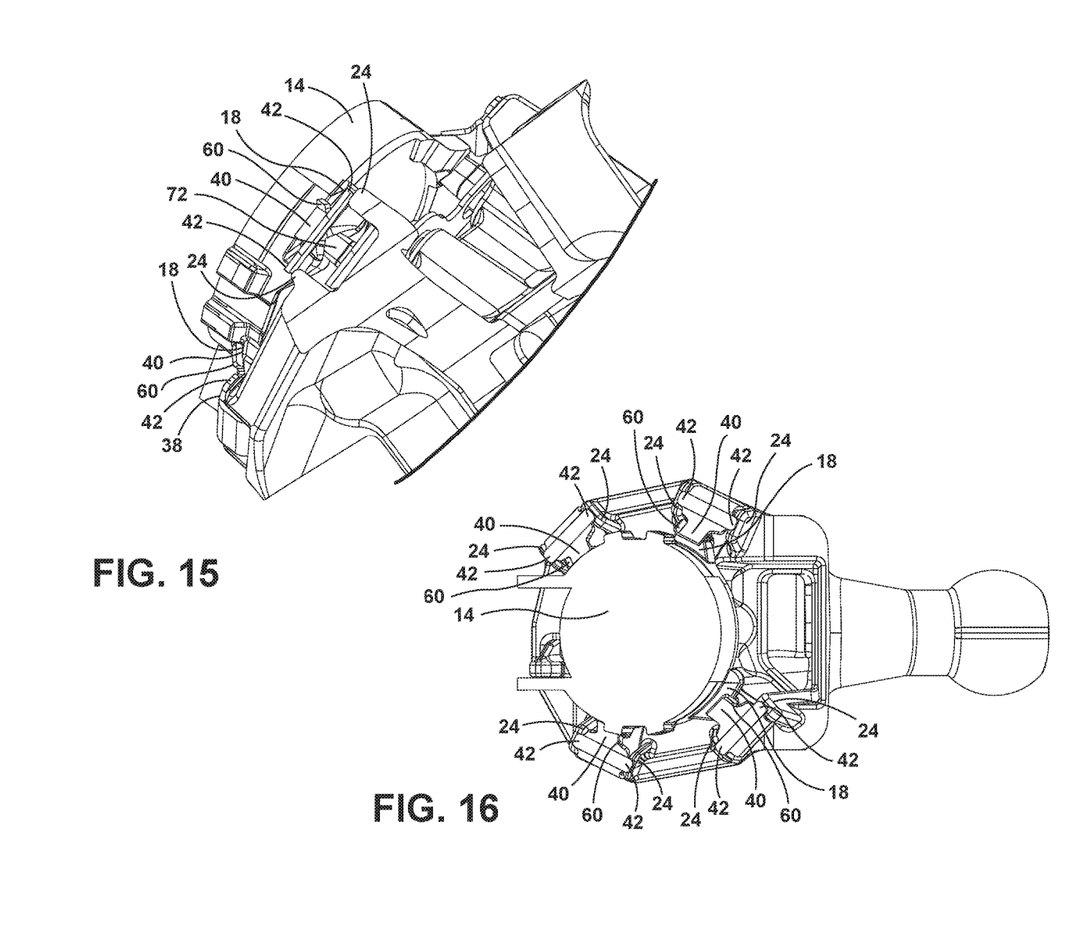
FIG. 15 is a side perspective view of a windshield bracket and mount after coupling.
FIG. 16 is a top perspective view of a windshield bracket and mount after coupling.

With reference to FIGS. 13-16, the mount 22 is configured to rotate relative to the windshield bracket 14. As shown in FIGS. 13 and 14, the spring clip 30 and the mount 22 are aligned so that the spring clip 30 can be rotated into engagement with the ledges 18 of the windshield bracket 14. At the beginning of rotation of the mount 22, the engagement ramp 60 of each of the legs 34 of the spring clip 30 abuts one ledge 18 of the windshield bracket 14. As the mount 22, and consequently, the spring clip 30, are rotated further, the engagement ramp 60 facilitates sliding of the engagement portion 40 onto the ledge 18 (FIGS. 15 and 16), thus providing a clamping force connection between the spring clip 30 and the windshield bracket 14. Due to the continued deflection of the spring legs 34 caused by engaging the ledges 18 of the windscreen bracket 14, the loading levers 42 may cease to be in contact with the pre-loading posts 24. This will transfer all of the pre-loading force to the windscreen bracket and increase the clamp force holding the mount, spring clip and mirror assembly to the windscreen bracket 14 through the windscreen bracket ledges 18. Installation is now complete. Notably, as illustrated in FIG. 15, the loading levers 42 may be spaced a predetermined distance from the pre-loading posts 24 after installation. In an exemplary embodiment, it is conceived that the loading levers 42 may only contact the pre-loading posts 24 after the spring clip 30 is fastened to the mount 22 and before the assembly is engaged to the windshield bracket 14.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its form, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, number of fasteners used, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A mounting assembly for a rearview device, the mounting assembly comprising:
   a windshield bracket having a body that includes ledges disposed about the body;
   a mount operably coupled with said rearview device, the mount including pre-loading posts; and
   a spring clip including a base and a plurality of legs, each leg including:
   an upright portion extending from the base;
   a connecting portion extending inwardly from the upright portion;
   an engagement portion extending upward away from the base; and
   at least one loading lever extending laterally from the connecting portion.

2. The mounting assembly of claim 1, wherein the engagement portion includes an engagement ramp extending at an angle relative to the engagement portion.

3. The mounting assembly of claim 1, wherein the at least one loading lever includes first and second loading levers extending outwardly from the connecting portion.

4. The mounting assembly of claim 3, wherein the first and second loading levers are on opposite sides of the connecting portion and extend in opposite directions.

5. The mounting assembly of claim 1, wherein the pre-loading posts force the connecting portion of the spring clip away from the base of the spring clip.

6. The mounting assembly of claim 1, further comprising:
a locating post extending through at least one of the plurality of legs of the spring clip.

7. The mounting assembly of claim 1, wherein one pre-loading post extends on opposing sides of each of the plurality of legs of the spring clip.

8. A mounting assembly for a rearview device, the mounting assembly comprising:
a mount operably coupled with said rearview device, the mount including at least one pre-loading post; and
a spring clip including a base and a plurality of legs, each leg including:
an upright portion extending from the base;
a connecting portion extending inwardly from the upright portion;
an engagement portion extending upward away from the base; and
at least one loading lever extending laterally from the connecting portion, the at least one loading lever configured to engage the at least one pre-loading post, which pushes the engagement portion away from the base.

9. The mounting assembly of claim 8, wherein the pre-loading posts force the connecting portion of the spring clip away from the base of the spring clip.

10. The mounting assembly of claim 8, further comprising:
a locating post extending through at least one of the plurality of legs of the spring clip.

11. The mounting assembly of claim 8, wherein one pre-loading post extends on opposing sides of each of the plurality of legs of the spring clip.

12. The mounting assembly of claim 8, wherein the engagement portion includes an engagement ramp extending at an angle relative to the engagement portion.

13. The mounting assembly of claim 8, wherein the at least one loading lever includes first and second loading levers extending outwardly from the connecting portion.

14. The mounting assembly of claim 13, wherein the first and second loading levers are on opposite sides of the connecting portion and extend in opposite directions.

15. A spring clip for a mounting assembly for a rearview device, the spring clip comprising:
a base; and
a plurality of legs extending outwardly from the base, each leg including:
an upright portion extending from the base;
a connecting portion extending inwardly from the upright portion;
an engagement portion extending upward away from the base; and
at least one loading lever extending laterally from the connecting portion, the at least one loading lever configured to engage a pre-loading post of a mount to push the engagement portion away from the base.

16. The mounting assembly of claim 15, wherein the engagement portion includes an engagement ramp extending at an angle relative to the engagement portion.

17. The mounting assembly of claim 15, wherein the at least one loading lever includes first and second loading levers extending outwardly from the connecting portion.

18. The mounting assembly of claim 17, wherein the first and second loading levers are on opposite sides of the connecting portion and extend in opposite directions.

\* \* \* \* \*